(12) United States Patent
Huang et al.

(10) Patent No.: US 12,371,086 B2
(45) Date of Patent: Jul. 29, 2025

(54) MOVABLE VEHICLE

(71) Applicant: Techtronic Cordless GP, Anderson, SC (US)

(72) Inventors: Jian Jun Huang, Dongguan (CN); Tao Wang, Dongguan (CN); Rong Wei Huang, Guangdong (CN)

(73) Assignee: TECHTRONIC CORDLESS GP, Anderson, SC (US)

(*) Notice: Subject to any disclaimer, the term of this patent is extended or adjusted under 35 U.S.C. 154(b) by 0 days.

(21) Appl. No.: 18/517,789

(22) Filed: Nov. 22, 2023

(65) Prior Publication Data
US 2024/0174279 A1 May 30, 2024

(30) Foreign Application Priority Data
Nov. 24, 2022 (CN) .................... 202211496719.X

(51) Int. Cl.
*B62B 3/00* (2006.01)
*B62B 3/08* (2006.01)
(Continued)

(52) U.S. Cl.
CPC .......... *B62B 5/0069* (2013.01); *B62B 5/0046* (2013.01); *B62B 5/0059* (2013.01);
(Continued)

(58) Field of Classification Search
CPC .... B62B 3/00; B62B 3/08; B62B 3/12; B62B 5/00; B62B 5/0033; B62B 5/0036;
(Continued)

(56) References Cited

U.S. PATENT DOCUMENTS 4,991,298 A    2/1991   Matre
6,327,781 B1   12/2001   Sinclair et al.
(Continued)

FOREIGN PATENT DOCUMENTS

AU   2014101295 A4   11/2014
AU   2020101331 A4   8/2020
(Continued)

OTHER PUBLICATIONS

Description Translation for CN 101327779 from Espacenet (Year: 2008).*

(Continued)

*Primary Examiner* — Jason D Shanske
*Assistant Examiner* — Daniel M. Keck
(74) *Attorney, Agent, or Firm* — Dority & Manning, P.A.

(57) ABSTRACT

The present invention provides a movable vehicle. The movable vehicle comprises a carrying mechanism and a holding mechanism connected to the carrying mechanism, and the bottom of the carrying mechanism is provided with wheels, wherein the movable vehicle further comprises a starting mechanism arranged on the holding mechanism, the starting mechanism comprising a starting unit, a power supply unit, and a controller. The starting unit is configured to be switchable between an initial position and a start position. The controller is configured to be electrically connectable to the power supply unit, wherein when the starting unit is in the start position, the starting unit is coupled to the controller to activate the electrical connection between the controller and the power supply unit, and when the starting unit is in the initial position, the starting unit is decoupled from the controller. According to the above solution, a user can easily activate the electrical connection between the controller and the power supply unit simply by operating the starting unit on the holding mechanism, (Continued)

thereby allowing the controller to further perform various control operations.

31 Claims, 14 Drawing Sheets

(51) Int. Cl.
*B62B 3/12* (2006.01)
*B62B 5/00* (2006.01)
*B62B 5/06* (2006.01)
*F16H 1/06* (2006.01)

(52) U.S. Cl.
CPC .............. *B62B 5/0066* (2013.01); *B62B 5/06* (2013.01); *F16H 1/06* (2013.01); *B62B 3/12* (2013.01)

(58) Field of Classification Search
CPC ... B62B 5/0046; B62B 5/0053; B62B 5/0059; B62B 5/0066; B62B 5/0069; B62B 5/06; F16H 1/06
See application file for complete search history.

(56) References Cited

U.S. PATENT DOCUMENTS

| | | | |
|---|---|---|---|
| 7,496,990 B2 | 3/2009 | Qiao | |
| 7,624,998 B2 | 12/2009 | Barlow et al. | |
| 7,739,800 B2 | 6/2010 | Hurley et al. | |
| 9,204,774 B1 | 12/2015 | Jackson | |
| 9,648,805 B2 | 5/2017 | Nie et al. | |
| 10,299,429 B2 | 5/2019 | Carl | |
| 11,013,172 B2 | 5/2021 | Carl | |
| 11,369,057 B2 | 6/2022 | Palermo et al. | |
| 2008/0230240 A1 | 9/2008 | Hurley | |
| 2009/0038283 A1 | 2/2009 | Hurley | |
| 2009/0178864 A1 | 7/2009 | Robinson et al. | |
| 2014/0167398 A1 | 6/2014 | Burns et al. | |
| 2021/0008705 A1 | 1/2021 | Sayer | |
| 2021/0039703 A1 * | 2/2021 | Kato | B62B 5/0414 |
| 2021/0127570 A1 | 5/2021 | Palermo et al. | |

FOREIGN PATENT DOCUMENTS

| | | | | |
|---|---|---|---|---|
| CA | 2868272 C | | 2/2018 | |
| CN | 101327779 A | * | 12/2008 | ............ B60R 25/04 |
| CN | 101147452 B | | 9/2011 | |
| CN | 203641199 U | | 6/2014 | |
| CN | 103616925 B | | 2/2016 | |
| CN | 104564939 B | | 2/2017 | |
| CN | 206602839 U | | 11/2017 | |
| CN | 210352198 U | | 4/2020 | |
| CN | 112537358 A | * | 3/2021 | ............... B62B 3/02 |
| DE | 202014105073 U1 | | 1/2015 | |
| DE | 102021004979 A1 | * | 4/2022 | ............ B60P 1/045 |
| EP | 1785027 B1 | | 8/2009 | |
| EP | 3082396 B1 | | 7/2018 | |
| EP | 3815504 A1 | | 5/2021 | |
| FR | 3012187 B3 | | 4/2016 | |
| GB | 2519667 B | | 9/2016 | |
| WO | WO2013002773 A1 | | 1/2013 | |
| WO | WO2015074596 A1 | | 5/2015 | |
| WO | WO2015094027 A1 | | 6/2015 | |
| WO | WO2017180978 A1 | | 10/2017 | |

OTHER PUBLICATIONS

European Search Report Corresponding to Application No. 232118430 on Apr. 18, 2024.

* cited by examiner

MOVABLE VEHICLE

This application claims the benefit of priority to Chinese Patent Application No. 202211496719.X, filed on Nov. 24, 2022, the disclosure of which is incorporated by reference herein in its entirety.

TECHNICAL FIELD

The present invention relates to an operating tool, in particular to a movable vehicle, for example, a pushcart.

BACKGROUND ART

Handcarts are common operating tools used to transport goods over short distances in construction sites, factory workshops, courtyards, gardens, etc. Most handcarts in the prior art need to be manually moved, and when such a handcart is used to transport heavy goods or under poor road conditions, great effort is often required, and the handcart may even become immovable or even overturn.

Therefore, it is necessary to provide a movable vehicle to at least partially solve the aforementioned problem.

SUMMARY OF THE INVENTION

An objective of the present invention is to provide a movable vehicle, for example, a pushcart. A movable vehicle according to a preferred embodiment of the present invention provides a power supply unit and a controller electrically connected to the power supply unit so that the movable vehicle is operable electrically, allowing an operator to choose between manual operation and electrical operation, which saves manpower when needed, while making operations more convenient and safer. In addition, a starting mechanism is arranged on the control mechanism, making it more convenient for a user to quickly and electrically start and control the movable vehicle by operating the starting mechanism.

Further, a movable vehicle of the present invention is further provided with a clutch mechanism, which allows switching between manual mode and electric mode, giving a user multiple choices so that the user switches between the modes according to different usage scenarios.

In addition, in a movable vehicle according to a preferred embodiment of the present invention, a first frame portion and a second frame portion are arranged and the first frame portion is made pivotable relative to the second frame portion, so that the first frame portion pivots to the lifted position during an unloading operation to facilitate the unloading of materials. Further, a support device is arranged to support the first frame portion when it is in the lifted position, thereby improving the stability of the first frame portion to prevent inappropriate spillage of materials.

According to one aspect of the present invention, a movable vehicle is provided, comprising a carrying mechanism and a holding mechanism connected to the carrying mechanism, and the bottom of the carrying mechanism is provided with wheels, wherein the movable vehicle further comprises a starting mechanism arranged on the holding mechanism, the starting mechanism comprising:

A starting unit configured to switch between an initial position and a start position;
A power supply unit;
A controller configured to be electrically connectable to the power supply unit, wherein when the starting unit is in the start position, the starting unit is coupled to the controller to activate the electrical connection between the controller and the power supply unit, and when the starting unit is in the initial position, the starting unit is decoupled from the controller.

In one embodiment, the starting mechanism further comprises a locking portion, which has a lock position and an unlock position, and is configured to, when in the lock position, lock the starting unit in the initial position.

In one embodiment, the starting unit is configured as a knob rotatably arranged on the holding mechanism, the knob being configured to be rotatable between the start position and the initial position.

In one embodiment, the knob comprises a knob body and a first connecting member, wherein one end of the first connecting member is connected to the knob body and extends along the axial direction of the knob body, the controller is provided with a second connecting member, and when the knob is in the start position, the first connecting member and the second connecting member are coupled together, wherein, preferably, the first connecting member is integrally formed on the knob body.

In one embodiment, the locking portion is configured as a locking rod, and one of the locking rod and the knob is provided with a protrusion and the other one thereof is provided with a recess that fits the protrusion, the protrusion being removably coupled in the recess, wherein, preferably, the protrusion is arranged on the locking rod and the recess is arranged on the knob.

In one embodiment, the locking rod is pivotally connected to the holding mechanism around a pivot shaft and a pressing portion is arranged on the locking rod, the pressing portion being opposite the protrusion on both sides relative to the pivot shaft.

In one embodiment, an elastic restoring member is connected between the locking rod and the holding mechanism, wherein, preferably, the elastic restoring member is configured as a spring.

In one embodiment, a torsion spring is arranged inside the knob, wherein one end of the torsion spring is connected to the knob and the other end thereof is connected to the holding mechanism.

In one embodiment, the movable vehicle further comprises an electric motor and a driving unit connected to the electric motor, wherein the electric motor drives the wheel axle of the wheel through the driving unit, wherein, preferably, the controller is electrically connected to the electric motor.

In one embodiment, the movable vehicle further comprises a clutch mechanism arranged on the carrying mechanism, and the clutch mechanism is configured to cause the driving unit to be selectively coupled to or decoupled from the wheel axle of the wheel.

In one embodiment, the controller is configured to be able to change the speed of the electric motor by changing the movement stroke of the second connecting member within a predetermined range, wherein, preferably, the first connecting member is configured to be able to further push the second connecting member from the start position in the direction toward the second connecting member and return to the start position, thus making the movement stroke of the second connecting member variable.

In one embodiment, the controller is configured to be able to change the rotation direction of the electric motor, and, preferably, the starting mechanism further comprises a direction adjustment rod, wherein a part of the direction adjustment rod is connected to the controller and the direction adjustment rod is operable in different directions to actuate the controller, thereby changing the rotation direction of the electric motor.

In one embodiment, the movable vehicle further comprises a first housing portion and a second housing portion opposite the first housing portion, the first housing portion is arranged on the side of the holding mechanism near the carrying mechanism, the first housing portion and the second housing portion are butt-jointed at the holding mechanism, the first housing portion and the second housing portion form an accommodating space, and the controller, a part of the locking portion, and the first connecting member are arranged in the accommodating space.

In one embodiment, one of the first housing portion and the second housing portion is provided with a first through hole and a second through hole, the direction adjustment rod extends through the first through hole, and the locking portion extends through the second through hole.

In one embodiment, the clutch mechanism comprises a linkage device, wherein the linkage device is coupled to the driving unit, and the linkage device is configured to be controllable to switch between a first position and a second position, wherein, when the linkage device is in the first position, the driving unit is coupled to the wheel axle of the wheel, and when the linkage device is in the second position, the driving unit is decoupled from the wheel axle of the wheel.

In one embodiment, the clutch mechanism further comprises an operating device connected to the linkage device, the operating device being operable to drive the linkage device to move.

In one embodiment, the operating device is operable to perform linear movement, driving the linkage device to rotate between the first position and the second position.

In one embodiment, the driving unit comprises a first driving member and a second driving member, the first driving member comprising a first gear, the second driving member comprising a second gear, the linkage device being coupled to the first gear, the first gear being connected to a motor shaft of the electric motor, the second gear being fixedly connected to the wheel axle of the wheel, wherein when the linkage device is in the first position, the first gear engages with the second gear, and when the linkage device is in the second position, the first gear disengages from the second gear.

In one embodiment, the linkage device comprises a connecting member connected to the operating device and a shift fork connected to the connecting member, the shift fork being coupled to the first gear, wherein, preferably, the connecting member is substantially L-shaped and has a first segment and a second segment substantially vertically connected to the first segment, the operating device is connected to the first segment, and the second segment is connected to the shift fork.

In one embodiment, the operating device comprises an operating portion and a rod-shaped portion, wherein a first end of the rod-shaped portion is connected to the operating portion and a second end of the rod-shaped portion is connected to the first segment, and preferably, the first segment is provided with a through hole, and a second end of the rod-shaped portion is connected in the through hole.

In one embodiment, the second end of the rod-shaped portion is provided with a reverse hook portion, the reverse hook portion having a substantially U-shaped cross section, the reverse hook portion being connected in the through hole.

In one embodiment, the first driving member further comprises a sleeve portion connected to the first gear and a flange portion connected to the sleeve portion, the sleeve portion and the flange portion are sleeved on the outside of the motor shaft, the first gear and the flange portion are respectively arranged at the two ends of the sleeve portion, and the shift fork is positioned between the first gear and the flange portion and is coupled to the sleeve portion, wherein, preferably, the first gear, the sleeve portion, and the flange portion are integrally formed as a whole.

In one embodiment, the shift fork comprises a main body portion as well as a first shift fork portion and a second shift fork portion that extend outward from the main body portion, the main body portion is fixedly connected to the connecting member, and the first shift fork portion, the second shift fork portion, and the main body portion are arranged around the sleeve portion.

In one embodiment, the carrying mechanism comprises a first frame portion and a second frame portion, the first frame portion being connected to the second frame portion, the first frame portion being pivotable relative to the second frame portion between an initial position and a lifted position.

Here, the carrying mechanism further comprises a support device, wherein a first end of the support device is connected to the first frame portion and a second end thereof is connected to the second frame portion, and the support device is configured to support the first frame portion when the first frame portion is in the lifted position, thereby keeping the first frame portion in the lifted position.

In one embodiment, the holding mechanism is connected to one end of the second frame portion, the first frame portion is pivotally connected to the second frame portion around a first pivot shaft, and the first pivot shaft is connected to the other end of the second frame portion away from the holding mechanism.

In one embodiment, the second frame portion comprises a second distal bracket, the second distal bracket being arranged at one end of the second frame portion away from the holding mechanism, the first frame portion comprises a first distal bracket, the first distal bracket being arranged at one end of the first frame portion away from the holding mechanism, and the first distal bracket is further away from the holding mechanism than the second distal bracket, wherein, preferably, the first pivot shaft is connected to the second distal bracket.

In one embodiment, the first frame portion further comprises a first extension frame and a second extension frame arranged to be substantially parallel to the first extension frame, the first distal bracket is connected to the ends of the first extension frame and the second extension frame, the first frame portion further comprises an intermediate bracket connected between the first extension frame and the second extension frame, and the intermediate bracket is arranged to be substantially parallel to the first distal bracket, wherein, preferably, the intermediate bracket is substantially arranged in a middle position of the first frame portion in a first direction, the first direction being limited to a direction of extension from the holding mechanism to the first distal bracket.

In one embodiment, a first end of the support device is connected to the intermediate bracket and a second end thereof is connected to the second distal bracket, wherein, preferably, the second end of the support device is pivotally connected to the second distal bracket via a second pivot shaft, the second pivot shaft being preferably arranged to be parallel to and spaced from the first pivot shaft in the first direction and closer to the holding mechanism.

In one embodiment, the support device comprises a mounting base, the mounting base being fixedly connected to the second distal bracket, the second pivot shaft being arranged on the mounting base, wherein, preferably, the mounting base has a substantially U-shaped overall structure, and the second pivot shaft is connected to both ends of the U-shaped structure.

In one embodiment, the support device further comprises a first support portion and a second support portion, the first support portion and the second support portion are separate components, the first support portion is connected to the intermediate bracket, the second support portion is connected to the second distal bracket, and the support device further comprises an elastic member configured to act simultaneously on the first support portion and the second support portion.

In one embodiment, the first support portion comprises a first peripheral portion and a first extension section connected to the first peripheral portion, the second support portion comprises a second peripheral portion and a second extension section connected to the second peripheral portion, the first extension section and the second extension section are arranged opposite each other, the elastic member is configured as a spring, and the spring is sleeved on the outside of at least one of the first extension section and the second extension section, wherein, when the first frame section is in the initial position, the spring is in a compressed state and both ends thereof are respectively connected to the first peripheral portion and the second peripheral portion.

In one embodiment, when the first frame portion is in the lifted position, the spring is in a free state.

In one embodiment, the support device further comprises a housing portion, the housing portion is sleeved on the outside of at least one part of the second support portion and the first support portion, the housing portion is connected to the mounting base, a slender guide hole is provided on the housing portion, the first support portion is provided with a protrusion, and the protrusion extends through the guide hole and is slidable along the guide hole, wherein, preferably, the housing portion comprises two guide holes symmetrically arranged relative to the central axis of the housing portion, and the first support portion comprises two corresponding protrusions.

In one embodiment, the support device comprises a hydraulic mechanism, the hydraulic mechanism comprising a hydraulic cylinder and a piston rod movably arranged in the hydraulic cylinder, the hydraulic cylinder being connected to the second distal bracket, the piston rod being connected to the intermediate bracket.

In one embodiment, the carrying mechanism further comprises a buckle device, the buckle device comprising a buckle groove and a buckle that fits the buckle groove, and one of the buckle groove and the buckle is connected to the first frame portion and the other one thereof is connected to the second frame portion, wherein, preferably, the buckle groove is connected to the first frame portion, and the buckle is connected to the second frame portion.

In one embodiment, the buckle device further comprises a main body portion, the main body portion being pivotally connected to the first frame portion, the buckle groove being connected to the main body portion, wherein, preferably, an elastic member is arranged between the main body portion and the first frame portion.

In one embodiment, when the first frame portion is in the initial position, the first frame portion is arranged to be substantially parallel to or in one plane with the second frame portion, and when the first frame portion is in the lifted position, the first frame portion is arranged substantially perpendicular to the second frame portion.

BRIEF DESCRIPTION OF THE DRAWINGS

To better understand the above and other objectives, features, advantages and functions of the present invention, reference may be made to the preferred embodiments shown in the drawings. In the drawings, identical reference symbols denote identical components. Those skilled in the art should understand that the drawings are intended to illustrate preferred embodiments of the present invention schematically, and have no limiting effect on the scope of the present invention, and the various components in the drawings are not drawn to scale.

SPECIFIC EMBODIMENTS

Figure 1:
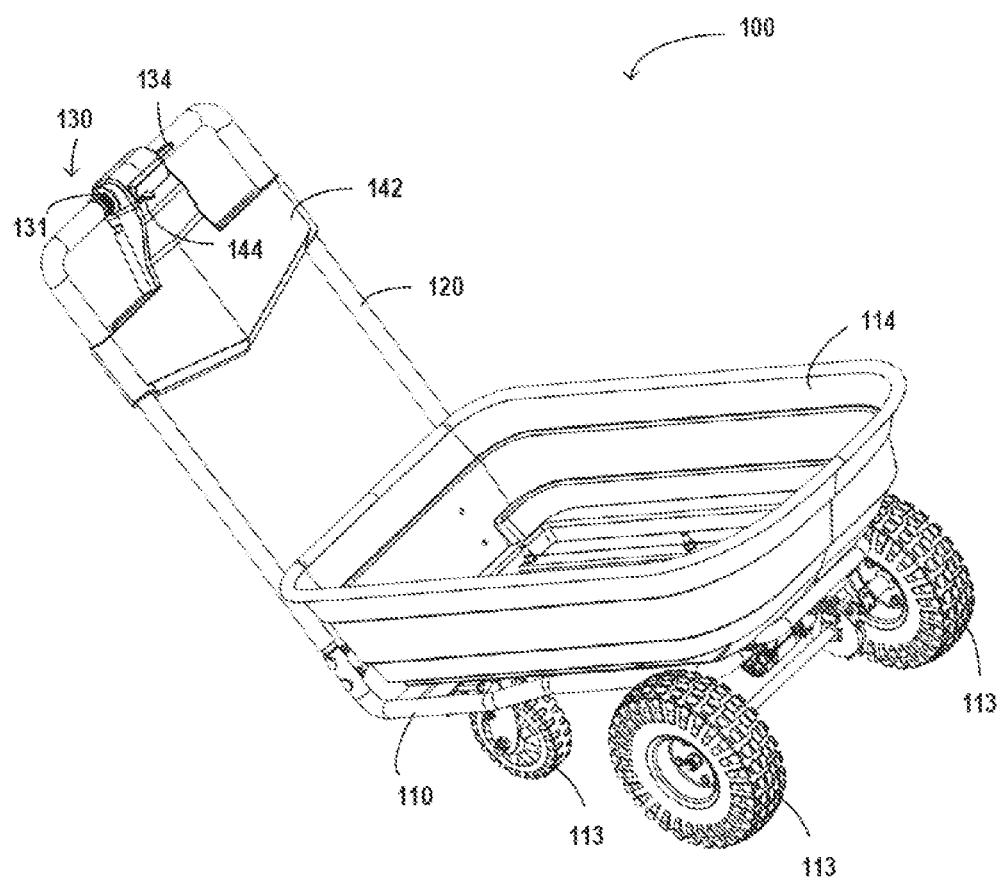
FIG. 1 is a three-dimensional view of a movable vehicle according to some preferred embodiments of the present invention.

Specific embodiments of the present invention are now described in detail by referring to the drawings. The embodiments described herein are merely preferred embodiments of the present invention. Based on these preferred embodiments, those skilled in the art will be able to think of other ways in which the present invention could be implemented, all of which likewise fall within the scope of the present invention.

It must first be explained that directional and positional terms in the present invention should be understood as meaning relative directions and positions rather than absolute directions and positions. The directional and positional terms in the present invention may be explained with reference to the exemplary structures shown in FIG. 1-FIG. 3.

Figure 2:
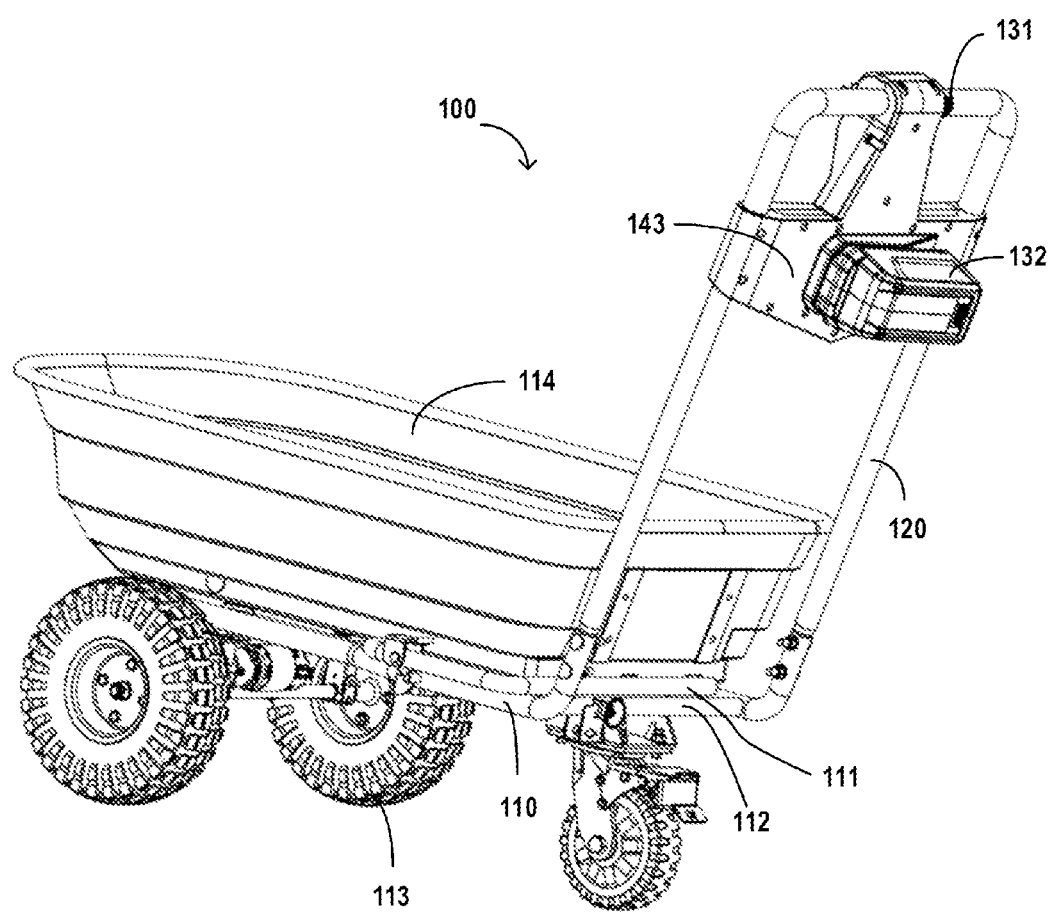
FIG. 2 is a three-dimensional view of the movable vehicle shown in FIG. 1 from another perspective.
Figure 3:
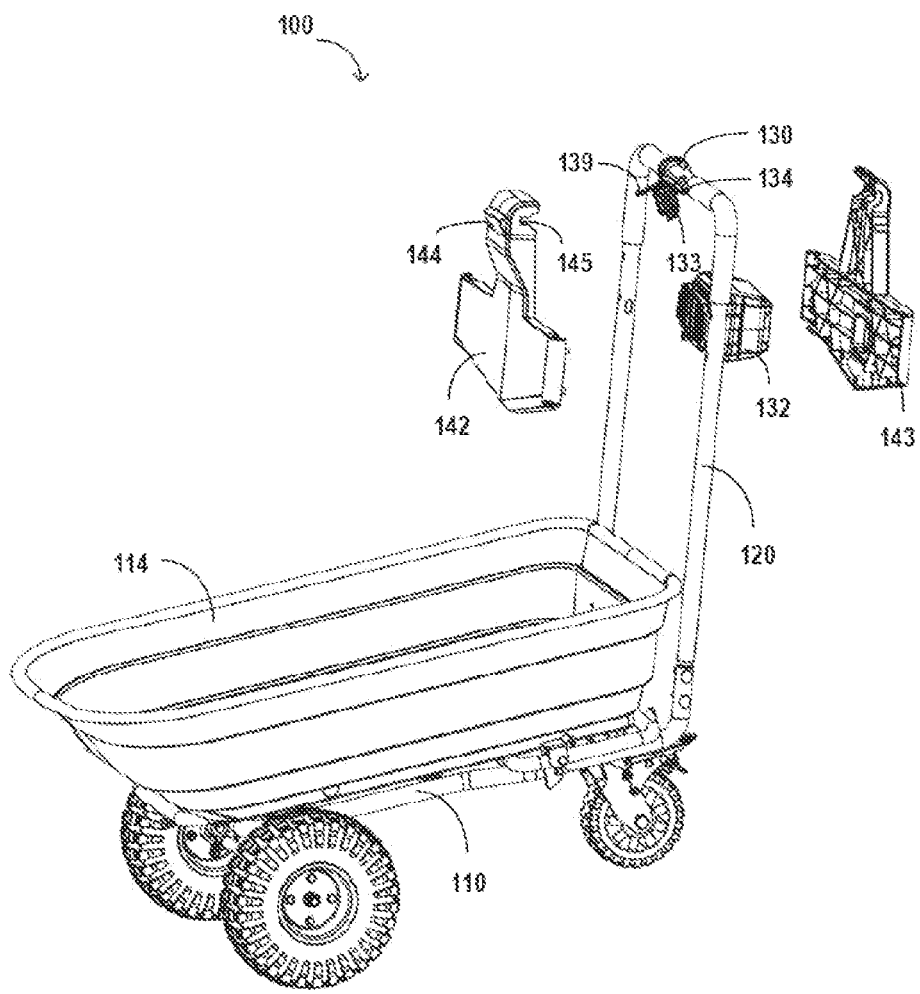
FIG. 3 is a three-dimensional view of the movable vehicle shown in FIG. 1, where in order to clearly illustrate the internal structure of the movable vehicle, the first and second housing portions are shown in a disassembled state.

FIG. 1-FIG. 3 show a movable vehicle 100 according to some embodiments of the present invention. In the illustrated embodiment, the movable vehicle 100 is a pushcart. The movable vehicle 100 comprises a carrying mechanism 110 and a holding mechanism 120 connected to the carrying mechanism 110. The carrying mechanism 110 may be used to carry various containers or materials such as goods, cargo boxes, or hoppers, and, in the illustrated embodiment, the carrying mechanism 110 carries a hopper 114 on it. The bottom of the carrying mechanism 110 is equipped with wheels 113. The holding mechanism 120 is holdable by a user to perform various operations such as pushing, pulling, or adjusting the direction of the movable vehicle 100.

In the illustrated embodiment, the holding mechanism 120 is substantially vertically connected to the carrying mechanism 110, so that the movable vehicle 100 is substantially L-shaped overall. It is understandable that in other embodiments not shown herein, the holding mechanism 120 may also be connected to the carrying mechanism 110 at an angle, preferably at an obtuse angle, so that a user can stand on the side of the holding mechanism 120 away from the hopper 114 to conveniently operate the holding mechanism 120.

As shown in FIG. 1-FIG. 4, the movable vehicle 100 further comprises a starting mechanism 130, which is arranged on the holding mechanism 120. In the illustrated embodiment, the starting mechanism 130 is arranged at the top of the holding mechanism 120 to be conveniently started by a user. It is understandable that in other embodiments not shown herein, the starting mechanism 130 may also be arranged at another position of the holding mechanism 120 that allows convenient user operations.

A detailed description of the structure of the starting mechanism 130 will be provided below.

In some embodiments of the present invention, the starting mechanism 130 comprises a starting unit 131, a power supply unit 132, and a controller 133. The starting unit 131 is configured to switch between an initial position and a start position. Preferably, the starting unit 131 is configured as a knob rotatably arranged on the holding mechanism 120. The knob may be turned between the initial position and the start position. When, for example, the movable vehicle 100 is in an idle state or when the electric mode of the movable vehicle 100 is not to be used, the knob may be placed in the initial position. When the electric mode of the movable vehicle 100 is to be used, the knob may be turned to the start position, which will be described in detail below. The power supply unit 132 is arranged below the knob, and for example, the power supply unit 132 may comprise a plurality of disposable batteries or rechargeable batteries.

The controller 133 is arranged close to the knob, and the controller 133 may be electrically connected to the power supply unit 132. When the knob is turned to the start position, the knob is coupled to the controller 133 to activate the electrical connection between the controller 133 and the power supply unit 132, thereby powering on the movable vehicle 100. When the knob is in the initial position, the knob is decoupled from the controller 133, thereby breaking the electrical connection between the controller 133 and the power supply unit 132.

Figure 4:
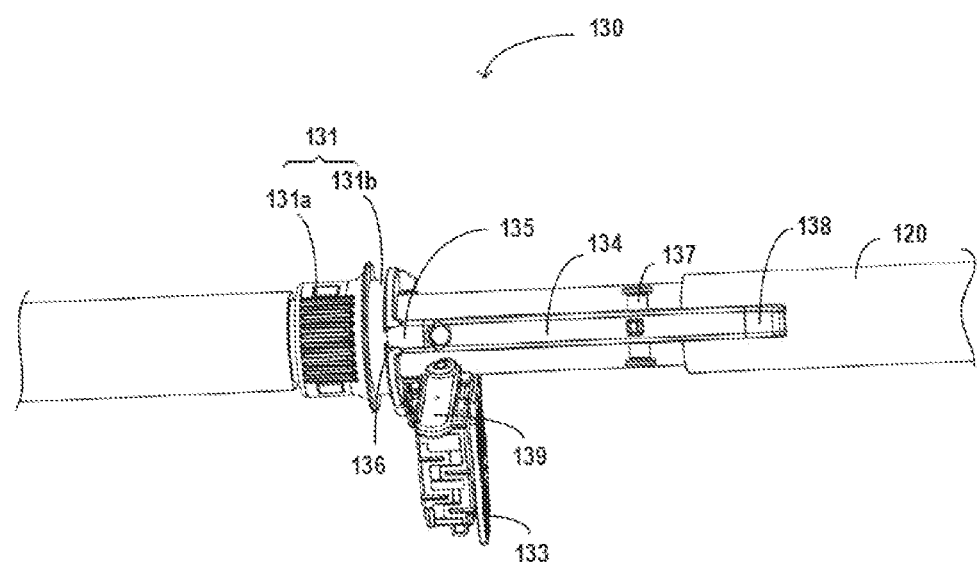
FIG. 4 is a schematic diagram of a part of the movable vehicle in FIG. 3, showing a starting mechanism.
Figure 5:
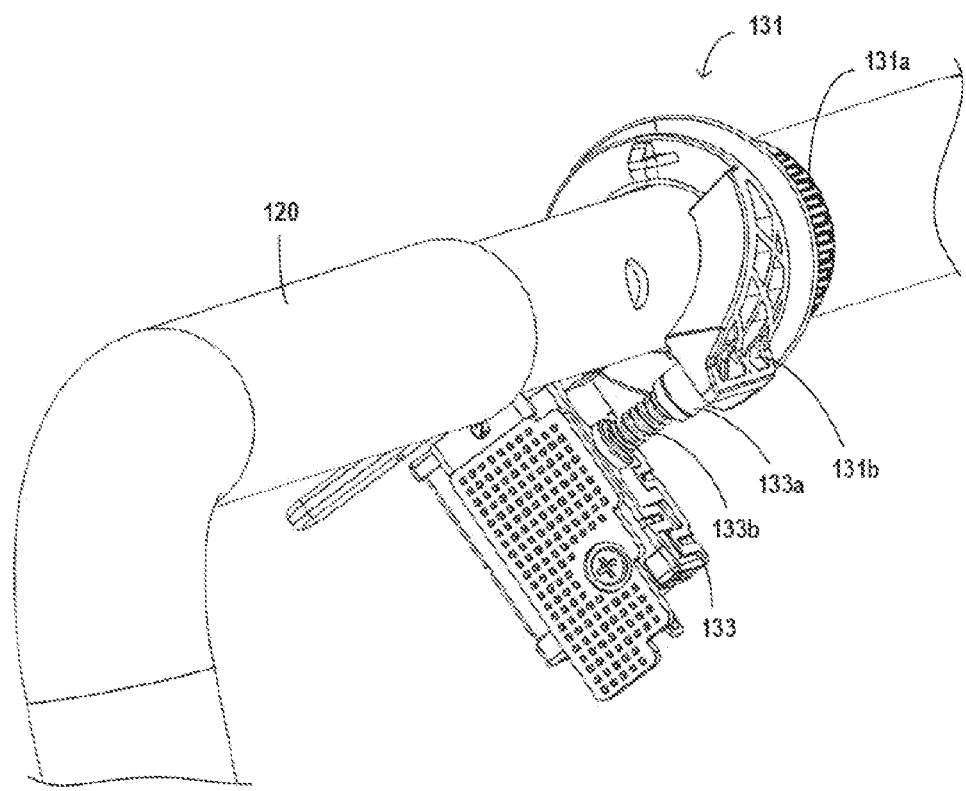
FIG. 5 is a schematic diagram of a part of the movable vehicle in FIG. 3, showing the starting mechanism from another perspective.

In some preferred embodiments, as shown in FIG. 4 and FIG. 5, the knob comprises a knob body 131a and a first connecting member 131b connected to the knob body 131a. The first connecting member 131b is substantially arranged in an arc around the holding mechanism 120, with one end thereof connected to the knob body 131a and extending along the axial direction of the knob body 131a from the knob body 131a. The first connecting member 131b can rotate with the knob body 131a when it rotates. Preferably, the first connecting member 131b is integrally formed on the knob body 131a by methods such as injection molding.

Again referring to FIG. 4 and FIG. 5, the controller 133 is provided with a second connecting member 133a, wherein, when the knob is in the start position, the arc-shaped end of the first connecting member 131b is coupled to the second connecting member 133a, thereby powering on the controller, so in this embodiment, the second connecting member 133a acts as an electric switch, and the first connecting member 131b acts as an actuating element of the electric switch. Further referring to FIG. 5, in some preferred embodiments, the second connecting member 133a is connected to the controller 133 through the elastic member 133b, and when a driving force is applied to the second connecting member 133a, the second connecting member 133a can overcome the elastic force of the elastic member 133b and move toward the controller 133, in which case the elastic member 133b is in a compressed state, and when the driving force applied to the second connecting member 133a is withdrawn, the second connecting member 133a can return to its original position under the restoring force of the elastic member 133b, thereby enabling the second connecting member 133a to perform reciprocating movements within a predetermined range. When the second connecting member 133a performs reciprocating movement, it may cause a change in the resistance value of the controller 133, for example. The controller 133 is configured to change the speed of the electric motor 140 when the second connecting member 133a performs reciprocating movements, thereby changing the rotation speed of the wheel. Further detailed descriptions will be given below.

In some preferred embodiments, the starting mechanism 130 further comprises a locking portion 134, the locking portion 134 having a lock position and an unlock position. When the locking portion is in the lock position, the knob is locked in the initial position to avoid being turned to the start position unexpectedly, thereby preventing any misoperations.

Preferably, the locking portion 134 is configured as a locking rod, which is connected to the holding mechanism 120 and extends along the length direction of the handheld part of the holding mechanism 120. The locking rod is switchable between the lock position and the unlock position. As shown in FIG. 4, in some preferred embodiments, the locking rod is provided with a protrusion 135, and the knob is circumferentially provided with a recess 136 that fits the protrusion 135, wherein the protrusion 135 is removably coupled in the recess 136. When the locking lever is in the lock position, the protrusion 135 is coupled in the recess 136 to limit the rotation of the knob. When the locking rod is in the unlock position, the protrusion 135 is decoupled from the recess 136, allowing the knob to rotate normally. It is understandable that in other embodiments not shown herein, the protrusion 135 may also be arranged on the knob, while the recess 136 is arranged on the locking rod.

In some preferred embodiments, the locking rod is pivotally connected to the holding mechanism 120 around a pivot shaft 137, with the axis of the pivot shaft perpendicular to the rotation axis of the knob, and the locking rod is further provided with a pressing portion 138, the pressing portion 138 being opposite the protrusion 135 on both sides relative to the pivot shaft 137. When the knob is to be unlocked, the pressing portion 138 on the locking rod may be pressed downward to make the protrusion 135 tilt upward, and then the protrusion 135 may be moved away from the recess 136 on the knob to unlock the knob. Further preferably, an elastic restoring member (not shown) is further connected between the locking rod and the holding mechanism 120, wherein, for example, the elastic restoring member may be configured as a spring or torsion spring, and can automatically cause the locking rod to return to the lock position when the locking rod is moved to the unlock position. The locking rod may also be designed to be movable horizontally along the axis of the knob, that is, locking and unlocking the knob by linear relative motion with the knob.

In some preferred embodiments, the knob is internally provided with a torsion spring (not shown), wherein one end of the torsion spring is connected to the knob and the other end thereof is connected to the holding mechanism 120. This torsion spring can apply a torsion force to the knob when the knob is operated to rotate from the initial position to the start position, so that the knob automatically rebounds to the initial position when released. It should be noted that when the knob is to be returned to its initial position, it is necessary to press the pressing portion 138 of the locking rod so that the locking rod is in the unlock position.

Figure 6:
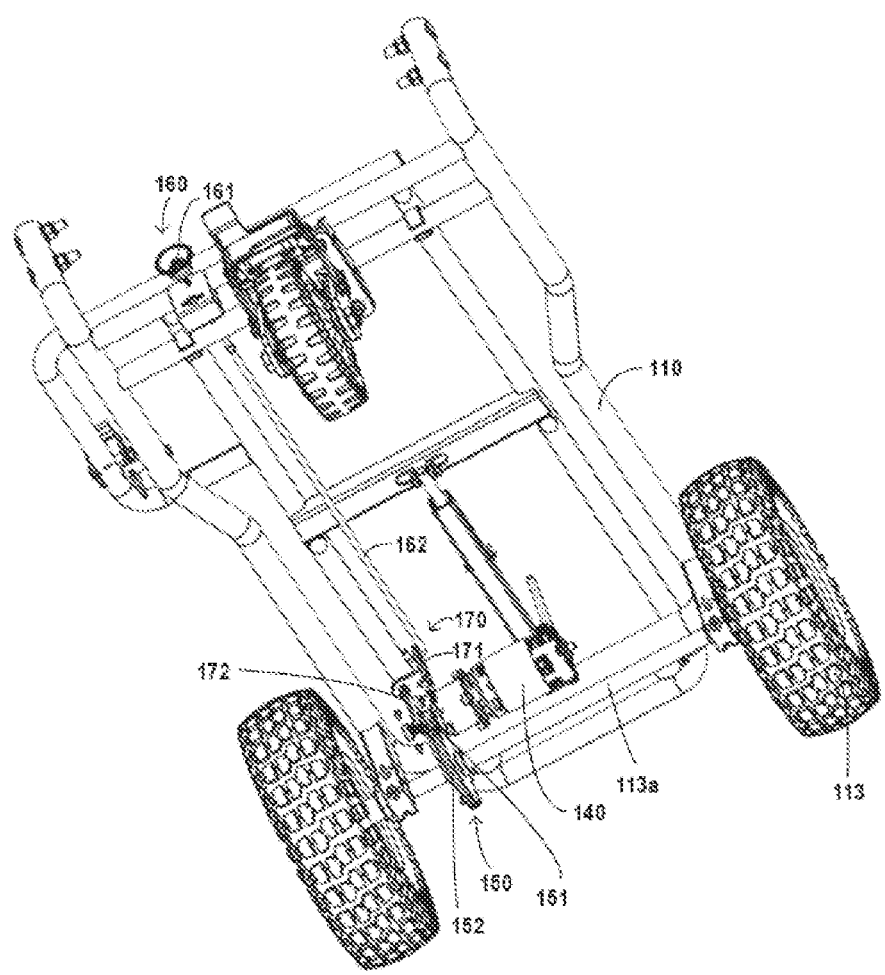
FIG. 6 is a three-dimensional schematic diagram of the carrying mechanism of the movable vehicle shown in FIG. 1 and the various components arranged on the carrying mechanism.
Figure 7:
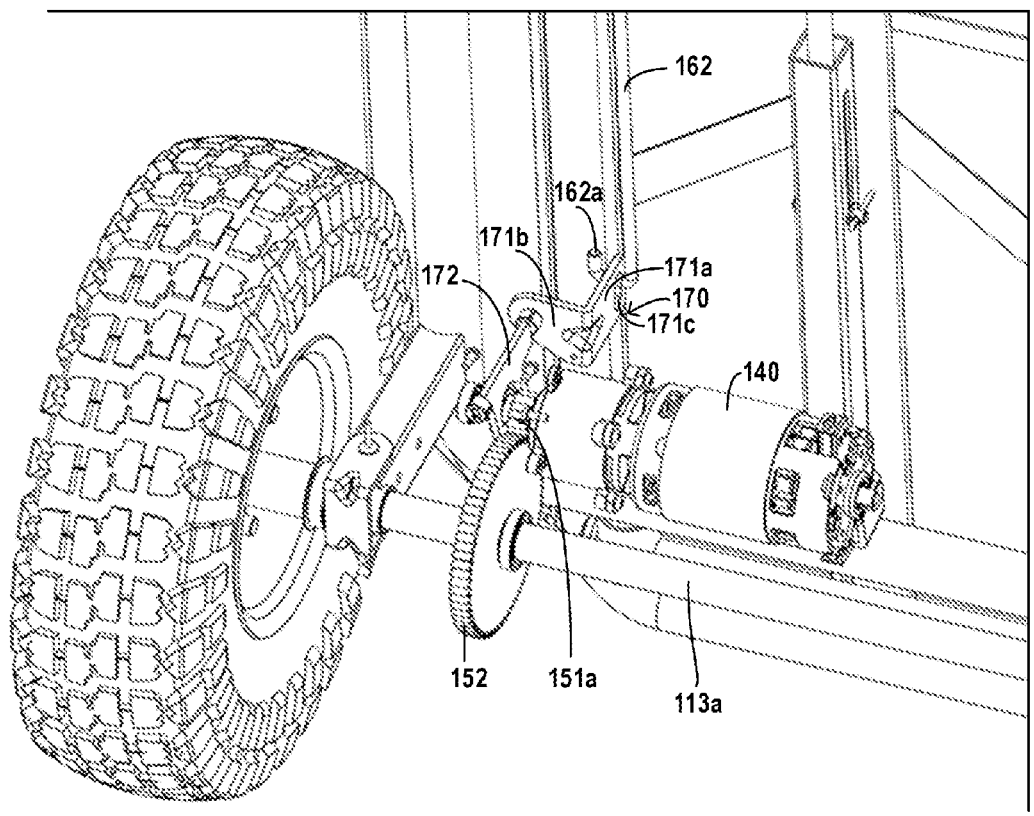
FIG. 7 and FIG. 8 are three-dimensional schematic diagrams of a part of the carrying mechanism shown in FIG. 6, wherein the shift fork is omitted in FIG. 8 to clearly show the structure of the first driving member.

As shown in FIG. 6 and FIG. 7, the movable vehicle 100 further comprises an electric motor 140, the electric motor 140 being arranged at the bottom of the carrying mechanism 110 and electrically connected to the controller 133, the electric motor 140 being capable of driving the wheel axle 113a of the wheel so that the movable vehicle 100 is operable in electric mode. Again referring to FIG. 6 and FIG. 7, the movable vehicle 100 further comprises a driving unit 150 connected to the electric motor 140, the electric motor 140 being capable of driving the wheel axle 113a of the wheel through the driving unit 150.

In some preferred embodiments, the movable vehicle 100 further comprises a clutch mechanism, which is arranged on the carrying mechanism 110 and is configured to cause the driving unit 150 to be selectively coupled to or decoupled from the wheel axle 113a of the wheel, wherein when the driving unit 150 is coupled to the wheel axle 113a of the wheel, the movable vehicle 100 may be driven electrically, and when the driving unit has not been coupled to the wheel axle 113a of the wheel, the movable vehicle 100 may be moved in manual mode, which allows the movable vehicle 100 to switch between the manual mode and the electric mode.

Referring to FIG. 6-FIG. 10, the clutch mechanism comprises an operating device 160 and a linkage device 170 connected to the operating device 160, wherein the linkage device 170 is coupled to the driving unit 150, and the operating device 160 is operable to drive the linkage device 170 to switch between a first position and a second position. As shown in FIG. 7, when the linkage device 170 is in the first position, a part of the driving unit 150 is coupled to the wheel axle 113a of the wheel, so that the power of the electric motor 140 may be transmitted to the wheel axle 113a of the wheel through the driving unit 150. When the linkage device 170 is in the second position, a part of the driving unit 150 disengages from the wheel axle 113a of the wheel, and in this state, the movable vehicle 100 may be driven manually.

Specifically, the driving unit 150 comprises a first driving member 151 and a second driving member, wherein the first driving member 151 comprises a first gear 151a, the first gear 151a being connected to the motor shaft 141 of the electric motor 140, and the second driving member comprises a second gear 152, the second gear 152 being connected to the wheel axle 113a of the wheel. The linkage device 170 is coupled to the first gear 151a and can drive the first gear 151a to move axially along the motor shaft 141 of the electric motor 140. As shown in FIG. 7, when the linkage device 170 is in the first position, the first gear 151a engages the second gear 152, and when the linkage device 170 is in the second position (not shown), the first gear 151a disengages from the second gear 152.

Figure 9:
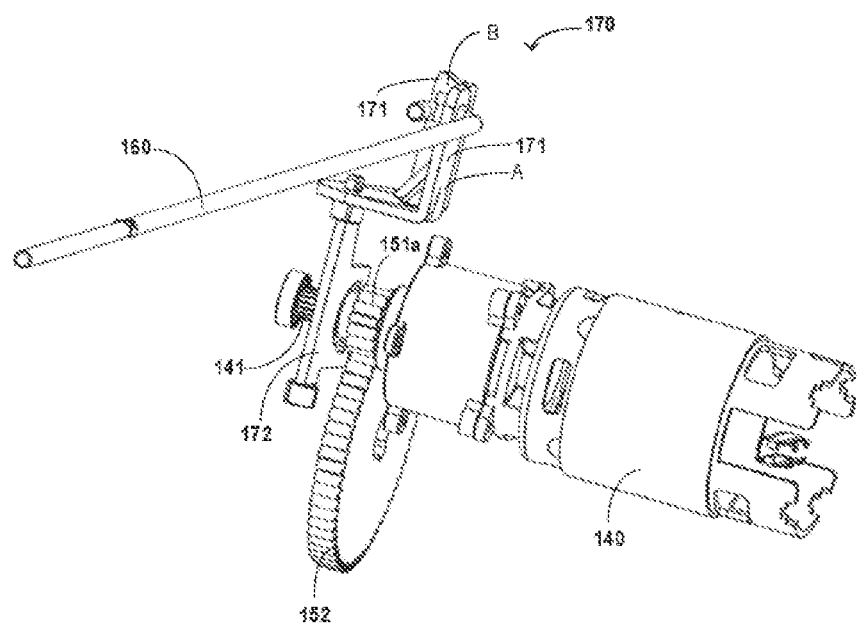
FIG. 9 is a three-dimensional schematic diagram of the clutch mechanism, electric motor, and driving unit of the movable vehicle shown in FIG. 1.

As shown in FIG. 9, in some preferred embodiments, the linkage device 170 comprises a connecting member 171 connected to the operating device 160 and a shift fork 172 connected to the connecting member 171. The shift fork 172 is coupled to the first gear 151a, and the operating device 160 is operable to perform linear movement along the axial direction of the rod-shaped portion 162 (to be described below), wherein when the operating device 160 performs linear movement, it drives the connecting member 171 and the shift fork 172 to turn between the first position and the second position. In order to clearly show the direction and angle of rotation of the connecting member 171, two connecting members 171 in two positions (positions A and B) are schematically shown in FIG. 9, wherein it is understandable that actually only one connecting member 171 is provided.

Preferably, as shown in FIG. 7, the connecting member 171 has a substantially L-shaped cross section, and has a plate-shaped first segment 171a and a plate-shaped second segment 171b that is substantially perpendicular to the first segment 171a, the first segment 171a being provided with a through hole 171c, the second segment 171b being fixedly connected to the shift fork 172.

Figure 8:
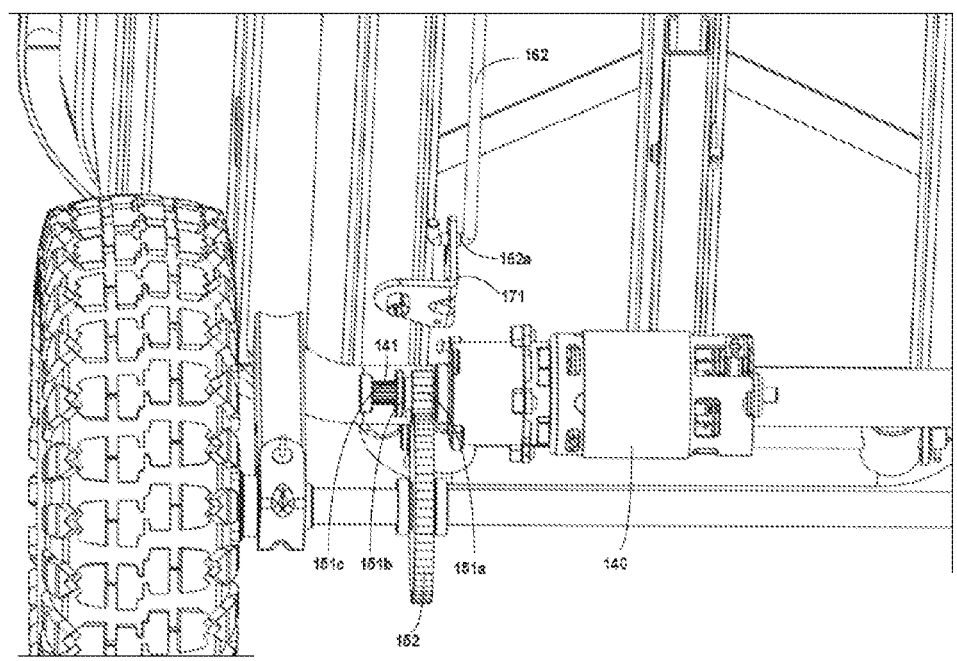
Figure 10:
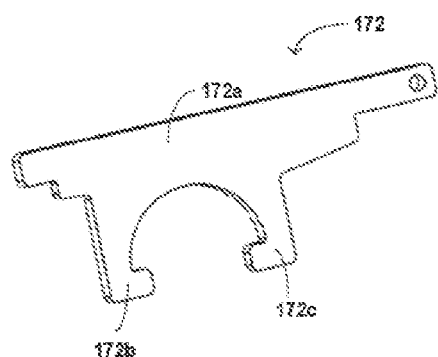
FIG. 10 is a three-dimensional schematic diagram of the shift fork of the clutch mechanism shown in FIG. 9.

As shown in FIG. 8, the first driving member 151 further comprises a sleeve portion 151b connected to the first gear 151a and a flange portion 151c connected to the sleeve portion 151b. The sleeve portion 151b and the flange portion 151c are movable axially with the first gear 151a. Preferably, the first gear 151a, the sleeve portion 151b, and the flange portion 151c are integrally formed components. The sleeve portion 151b and the flange portion 151c are both sleeved on the outside of the motor shaft 141, wherein the first gear 151a and the flange portion 151c are respectively arranged at the two ends of the sleeve portion 151b, the shift fork 172 (see FIG. 9) is positioned between the first gear 151a and the flange portion 151c and is coupled to the sleeve portion 151b, and the flange portion 151c can limit the shift fork 172 to prevent detachment of the shift fork 172. Preferably, as shown in FIG. 10, the shift fork 172 comprises a main body portion 172a as well as a first shift fork portion 172b and a second shift fork portion 172c that extend outward from the main body portion, assuming a substantially C-shaped form, wherein the main body portion 172a is fixedly connected to the connecting member 171, and the first shift fork portion 172b, the second shift fork portion 172c, and the main body portion 172a are arranged around the sleeve portion 151b. When the connecting member 171 rotates, it drives the shift fork 172 to swing, so that the first shift fork 172b and the second shift fork 172c move the first driving member 151 axially along the motor shaft 141, thereby achieving engagement or disengagement between the first gear 151a and the second gear 152.

Referring to FIG. 6, the operating device 160 comprises an operating portion 161 and a rod-shaped portion 162. The operating portion 161 is suitable for handheld operation, for example, being substantially trumpet-shaped to be operable by a user. The first end of the rod-shaped portion 162 is connected to the operating portion 161, and the second end of the rod-shaped portion 162 is connected to the through hole 171c in the second segment of the connecting member 171. In some preferred embodiments, the second end of the rod-shaped portion 162 is provided with a reverse hook portion 162a, the reverse hook portion having a substantially U-shaped cross section, the reverse hook portion 162a extending through the through hole 171c and being movably connected in the through hole 171c. When the rod-shaped portion 162 is pushed or pulled through the operating portion 161, the connecting member 171 is rotatable in different directions.

As shown in FIG. 9, when the rod-shaped portion 162 is pushed along the axial direction of the rod-shaped portion 162, the connecting member 171, under the driving force of the rod-shaped portion 162, is rotatable from position A to position B on the axis of the main body portion 172a of the shift fork 172 (see FIG. 10), and, meanwhile, since the main body portion 172a is fixedly connected to the connecting member 171, when the connecting member 171 rotates from position A to position B, the first shift fork portion 172b and second shift fork portion 172c of the shift fork 172 (see FIG. 10) can move the first driving member 151 in a direction away from the second driving member. Similarly, when the rod-shaped portion 162 is pulled, the connecting member 171 is rotatable from position B to position A on the axis of the main body portion 172a of the shift fork 172 (see FIG. 10), and, meanwhile, the first shift fork portion 172b and second shift fork portion 172c of the shift fork 172 (see FIG. 10) can move the first driving member 151 in the direction toward the second driving member.

In some preferred embodiments, the controller 133 can change the speed and direction of travel of the wheel 113 by controlling the speed and direction of rotation of the electric motor 140. The controller 133 is configured to be able to change the speed of the electric motor 140 by changing the movement stroke of the second connecting member 133a within a predetermined range. The first connecting member 131b is configured to be able to further push the second connecting member 133a from the start position in the direction toward the second connecting member 133a and return to the start position, thereby changing the movement stroke of the second connecting member 133a. Further referring to FIG. 5, in some preferred embodiments, the second connecting member 133a is connected to the controller 133 through the elastic member 133b, and when a driving force is applied to the second connecting member 133a, the second connecting member 133a can overcome the elastic force of the elastic member 133b and move toward the controller 133, in which case the elastic member 133b is in a compressed state, and when the driving force applied to the second connecting member 133a is withdrawn, the second connecting member 133a can return to its original position under the restoring force of the elastic member 133b, thereby enabling the second connecting member 133a to perform reciprocating movement within a predetermined range. When the second connecting member 133a performs reciprocating movement, it may cause a change in the resistance value of the controller 133, for example. The controller 133 is configured to change the speed of the electric motor 140 during reciprocating movement of the second connecting member 133a.

In practical operation, when the first connecting member 131b is in the start position, a user can rotate the knob body 131a to cause the first connecting member 131b to further push the second connecting member 133a from the start position in the direction toward the second connecting member 133a, and the first connecting member 131b can return to the start position under the action of the elastic member 133b, so that the movement stroke of the second connecting member 133a is variable.

The controller 133 is further configured to change the direction of rotation of the electric motor 140. As shown in FIG. 4, in some preferred embodiments, the starting mechanism 130 further comprises a direction adjustment rod 139, wherein a part of the direction adjustment rod 139 is connected to the controller 133, and the direction adjustment rod 139 is operable in different directions, for example, to perform a translational motion or swing, thereby actuating the controller 133 so that the controller 133 changes the direction of rotation of the electric motor 140.

Referring back to FIG. 1 and FIG. 3, the movable vehicle 100 further comprises a first housing portion 142 and a second housing portion 143 opposite the first housing portion 142. The first housing portion 142 and the second housing portion 143 are respectively arranged on the two sides of the holding mechanism 120, wherein, specifically, the first housing portion 142 is arranged on the side of the holding mechanism 120 near the carrying mechanism 110, and the second housing portion 143 is arranged on the side of the holding mechanism 120 opposite the carrying mechanism 110. The first housing portion 142 and the second housing portion 143 are butt-jointed at the holding mechanism 120, wherein the first housing portion 142 and the second housing portion 143 form an accommodating space. The controller 133, a part of the locking rod, and the first connecting piece 131b are all arranged in the accommodating space.

In some preferred embodiments, the first housing portion 142 is provided with a first through hole 144 and a second through hole 145, and a part of the direction adjustment rod 139 is arranged in the accommodation space and another part thereof extends through the first through hole 144, thereby facilitating user operation. A part of the locking rod is arranged in the accommodation space, and another part thereof, comprising the pressing portion 138, extends to the outside through the second through hole 145 to facilitate user operation.

The structure of the carrying mechanism 110 will be described in detail below with reference to FIG. 1-FIG. 2, as well as FIG. 11-FIG. 14.

As shown in FIG. 1-FIG. 2, the carrying mechanism 110 comprises a first frame portion 111 and a second frame portion 112, the first frame portion 111 being connected to the second frame portion 112. In the illustrated embodiment, the first frame portion 111 is connected above the second frame portion 112. It is understandable that in other embodiments not shown herein, the first frame portion 111 may also have another position, wherein, for example, the first frame portion 111 and the second frame portion 112 may be in the same plane, or a part of the first frame portion 111 and a part of the second frame portion 112 may intersect in an up-down manner. The wheel 113 is mounted on the second frame portion 112, and the holding mechanism 120 is connected to one end of the second frame portion 112. The hopper 114 is placed on the first frame portion 111. Preferably, a clamp device (not shown) for fixing the hopper 114 may be provided on the first frame portion 111 to ensure that the hopper 114 remains stable during transportation, without falling off the movable carrier 100. For example, the clamp device may be a retaining device arranged around the first frame portion 111, and those of ordinary skill in the art may also arrange other forms of clamp devices according to actual needs.

The first frame portion 111 is pivotally connected to the second frame portion 112, and the first frame portion 111 is pivotable between the initial position and the lifted position relative to the second frame portion 112. In some preferred embodiments, when the first frame portion 111 is in its initial position, the first frame portion 111 is arranged to be substantially parallel to the second frame portion 112. It is understandable that, for example, when a material is to be loaded into the hopper on the movable carrier 100, or when the movable carrier 100 is transporting a material, the first frame portion 111 may be placed in the initial position. When the first frame portion 111 is in the lifted position, the first frame portion 111 is lifted, and the first frame portion 111 is arranged substantially perpendicular to the second frame portion 112. For example, the first frame portion 111 and the second frame portion 112 may be at an angle of 90 degrees, or slightly greater or smaller than 90 degrees. It is understandable that, for example, when the goods on the movable vehicle 100 are to be unloaded, the first frame portion 111 may be placed in the lifted position.

Figure 11:
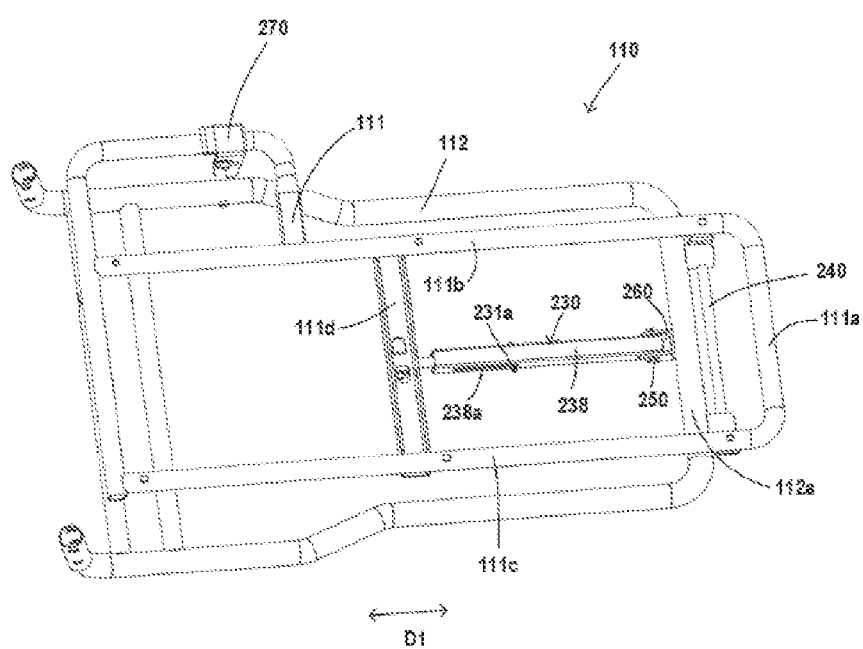
FIG. 11 is a three-dimensional view of the carrying mechanism of the movable vehicle shown in FIG. 1.
Figure 12:
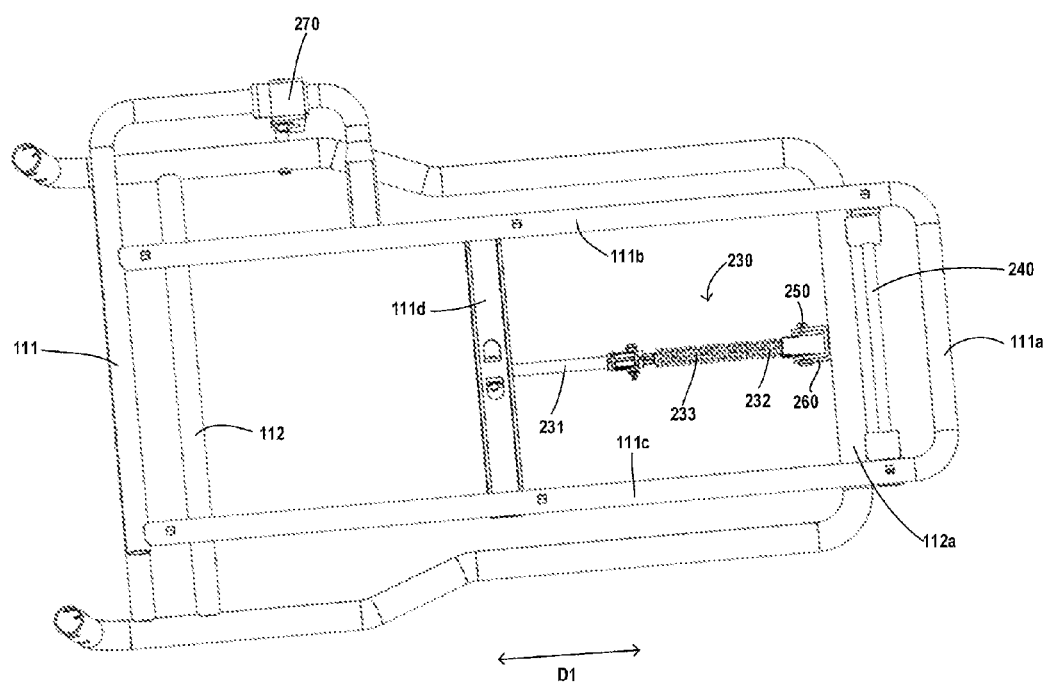
FIG. 12 is another three-dimensional view of the carrying mechanism in FIG. 11, where the housing portion is omitted to clearly illustrate the structure of the support device.

As shown in FIG. 11 and FIG. 12, in some preferred embodiments, the first frame portion 111 comprises a first distal bracket 111a, wherein the first distal bracket 111a is arranged at one end of the first frame portion 111 away from the holding mechanism 120, and the first distal bracket 111a is substantially parallel to the pivot shaft of the first frame portion 111. The second frame portion 112 comprises a second distal bracket 112a, the second distal bracket 112a being arranged at one end of the second frame portion 112 away from the holding mechanism 120, the second distal bracket 112a being substantially parallel to the first distal bracket 111a. Preferably, the first distal bracket 111a is further away from the holding mechanism 120 than the second distal bracket 112a, which means that in a first direction D1 limited to extending from the holding mechanism 120 to the first distal bracket 111a, the first distal bracket 111a extends beyond the second distal bracket 112a, wherein, with this solution, in one aspect, the first frame portion 111 is provided with a larger carrying range for carrying the hopper 114, and, in another aspect, the first distal bracket 111a may be supported on the ground when the first frame portion 111 is in the lifted position, thereby improving the stability of the first frame portion 111.

As shown in FIG. 11 and FIG. 12, the first frame portion 111 is pivotally connected to the second frame portion 112 around the first pivot shaft 240. The first pivot shaft 240 is connected to the other end of the second frame portion 112 away from the holding mechanism 120. Specifically, the first pivot shaft 240 is connected to the front end of the second distal bracket 112a. It should be noted that the directional term "front end" mentioned herein refers to the end of the movable vehicle 100 that is far away from the holding mechanism 120, and the end where the holding mechanism 120 is located is defined as the "back end".

Figure 15:
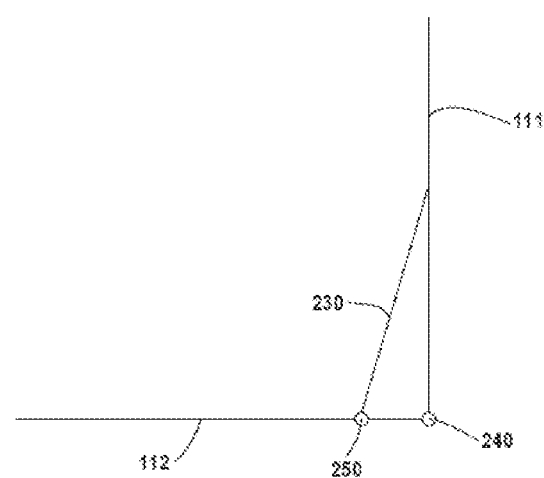
FIG. 15 is a simplified schematic diagram of the carrying mechanism of the movable vehicle shown in FIG. 1, where the first frame portion is in the lifted position.

In order to further improve the stability of the first frame portion 111 in the lifted position, in some preferred embodiments, the carrying mechanism 110 further comprises a support device 230, wherein the support device 230 can support the first frame portion 111 from one side of the first frame portion 111 when the first frame portion 111 is in the lifted position, thereby keeping the first frame portion 111 in the lifted position (as schematically shown in FIG. 15). As shown in FIG. 11, the first end of the support device 230 is connected to the first frame portion 111 and the second end thereof is connected to the second frame portion 112.

Further referring to FIG. 11 and FIG. 12, the first frame portion 111 further comprises a first extension frame 111b and a second extension frame 111c arranged to be substantially parallel to the first extension frame 111b, the first distal bracket 111a is connected between the first extension frame 111b and the second extension frame 111c, and the two ends of the first pivot shaft 240 are connected to the first extension frame 111b and the second extension frame 111c respectively. In some preferred embodiments, the first frame portion 111 further comprises an intermediate bracket 111d, the intermediate bracket 111d being connected between the first extension frame 111b and the second extension frame 111c, the intermediate bracket 111d being arranged to be substantially parallel to the first distal bracket 111a.

In some preferred embodiments, the intermediate bracket 111d is arranged substantially in the middle position of the first frame portion 111 in the first direction D1. The first end of the support device 230 is connected to the intermediate bracket 111d and the second end thereof is connected to the second distal bracket 112a. In this solution, the intermediate bracket 111d is arranged substantially in the middle position of the first frame section 111 and one end of the support device 230 is connected to the intermediate bracket 111d, which ensures the support effect of the support device 230 while allowing a reduction in the length of the support device 230 to reduce costs.

In some preferred embodiments, the second end of the support device 230 is pivotally connected to the second distal bracket 112a via the second pivot shaft 250, so that when the first frame portion 111 is pivoted from the initial position to the lifted position, the support device 230 is pivotable together with the first frame portion 111. Preferably, the second pivot shaft 250 is substantially parallel to the first pivot shaft 240, and the second pivot 250 is spaced at a certain distance from the first pivot shaft 240 in the first direction D1, and the second pivot shaft 250 is closer to the intermediate bracket 111d, that is, being closer to the holding mechanism 120, than the first pivot shaft 240. As schematically shown in FIG. 15, in this solution, when the first frame portion 111 is in the lifted position, the support device 230 forms a triangular support structure with the first frame portion 111 and the second frame portion 112, thereby improving the support stability.

Figure 13:
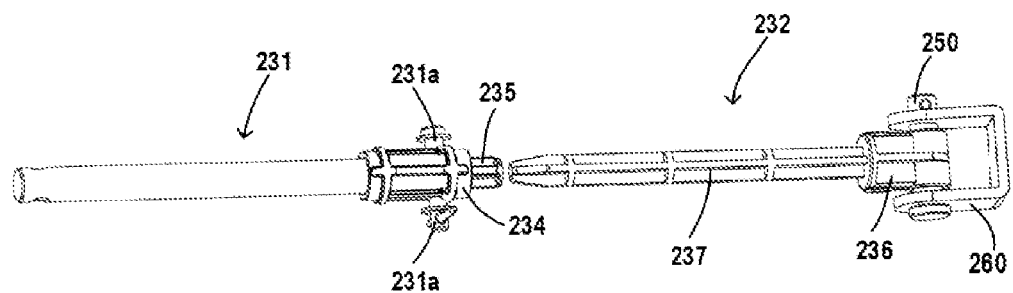
FIG. 13 is a schematic diagram of the support device of the carrying mechanism in FIG. 12, where the housing portion and elastic member are omitted.

As shown in FIG. 11-FIG. 13, the support device 230 further comprises a mounting base 260, the mounting base 260 being fixedly connected to the second distal bracket 112a. For example, the mounting base is connectable to the second distal bracket 112a by methods such as welding or fastening with a screw. Preferably, the mounting base 260 has a substantially U-shaped overall structure, wherein the bottom end of the U-shaped structure is connected to the second distal bracket 112a. The second pivot shaft 250 is connected to both ends of the U-shaped structure.

In some preferred embodiments, the support device 230 further comprises a first support portion 231 and a second support portion 232, wherein the first support portion 231 and the second support portion 232 are separate components and spaced from each other in the first direction D1. The first support portion 231 is fixedly connected to the intermediate bracket 111d, and the second support portion 232 is connected to the second pivot shaft 250. As shown in FIG. 13, in some preferred embodiments, the first support portion 231 comprises a first peripheral portion 234 and a first extension section 235 connected to the first peripheral portion 234, the second support portion 232 comprises a second peripheral portion 236 and a second extension section 237 connected to the second peripheral portion 236, the first extension section 235 and the second extension section 237 are arranged opposite each other, and the length of the second extension section 237 is greater than that of the first extension section 235.

The support device 230 further comprises an elastic member configured to simultaneously act on the first support portion 231 and the second support portion 232. In some preferred embodiments, the elastic member is configured as a spring 233. In some preferred embodiments, the spring 233 has no connection relationships with the first extension section 235 or the second extension section 237, wherein the spring 233 is mainly sleeved on the outside of the second extension section 237, and, depending on the rotational state of the first frame portion 111, a part of the spring 233 may also be sleeved on the outside of the first extension section 235, as will be explained in detail below. In some other preferred embodiments, one end of the spring 233 is connectable to the second extension section 237, while the other end thereof is not connected to the first extension section 235. In still some other preferred embodiments, both ends of the spring 233 are connectable to the first extension section 235 and the second extension section 237, respectively. Preferably, when the first frame portion 111 is in its initial position, the spring 233 is sleeved on the outside of the first extension section 235 and that of the second extension section 237, in a compressed state, and both ends thereof are connected to the first peripheral portion 234 and the second peripheral portion 236, respectively.

It is understandable that when the first frame portion 111 rotates from the initial position to the lifted position, the distance from the first end to the second end of the support device 230 may be increased with the rotation of the support device 230, and, during this process, the spring 233 will gradually rebound from the compressed state. In some preferred embodiments, when the first frame portion 111 is in the lifted position, the spring returns to a free state. When the spring 233 has returned to a free state, one end thereof may no longer butt against the first peripheral portion 234 and it may be partially sleeved on the outside of the first extension section 235. When one end of the spring 233 is connected to the first extension section 235, when the first frame portion 111 continues to flip away from the second frame portion 112 from the lifted position, the spring 233 will be stretched, thereby applying a restoring force to the first frame portion 111, causing the first frame portion 111 to automatically return to its original position. In this solution, the arrangement of an elastic member may produce a certain buffer effect, especially performing a damping action when the first frame portion 111 is returned from the lifted position to the initial position, so that the first frame portion 111 returns to its original position softly and thus falls slowly, which avoids collision with the second frame portion 112 to reduce accidental damage to the first frame portion 111 or the second frame portion 112.

As shown in FIG. 11, the support device 230 further comprises a housing portion 238, the housing portion 238 being sleeved on the outside of the entire second support portion 232 and on the outside of at least a part of the first support portion 231. In the illustrated embodiment, the housing portion 238 is sleeved on the outside of a part of the first support portion 231. It is understandable that in other embodiments not shown herein, the housing portion 238 may also be sleeved on the outside of the entire first support portion 231. In some preferred embodiments, the housing portion 238 has a substantially square cross section, and the housing portion 139 is configured to be substantially parallelepipedal. The housing portion 238 is connected to the mounting base 260 through the second pivot shaft 250 and is rotatable relative to the mounting base 260.

In some preferred embodiments, the housing portion 238 is provided with a guide hole 238a that extends along the length direction thereof, and, correspondingly, as shown in FIG. 12 and FIG. 13, the first support portion 231 is provided with a cylindrical protrusion 231a that protrudes outward along the radial direction thereof, the protrusion 231a extending through the guide hole 238a and being slidable along the guide hole 238a. In this solution, by arranging a guide hole 238a, the movement of the first support portion 231 is guidable so that it moves along a predetermined trajectory, and the first support portion 231 is prevented from coming off the housing portion 238 during the movement process and consequently affecting the support effect of the support device 230.

Further preferably, the housing portion 238 comprises two guide holes 238a, the two guide holes 238a being symmetrically arranged with respect to the central axis of the housing portion 238. Accordingly, the first support portion 231 comprises two protrusions 231a corresponding to the two guide holes 238a.

In some preferred embodiments, the support device may further comprise a hydraulic mechanism (not shown), which comprises a hydraulic cylinder and a piston rod movable in the hydraulic cylinder. The hydraulic cylinder is connectable to the second distal bracket 112a, and the piston rod is connectable to the intermediate bracket 111d. The hydraulic mechanism is substantially the same as a hydraulic mechanism commonly used in this field, so, for the sake of simplicity, it will not be described in detail again herein.

Figure 14:
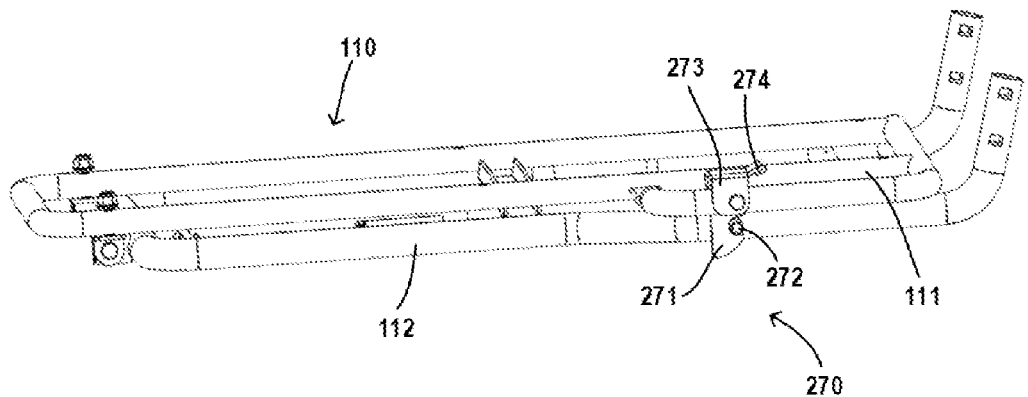
FIG. 14 is a three-dimensional view of the carrying mechanism of the movable vehicle shown in FIG. 1 from another perspective.

In some preferred embodiments, as shown in FIG. 11 and FIG. 12, the carrying mechanism 110 further comprises a buckle device 270, the buckle device 270 being capable of locking the first frame portion 111 to the second frame portion 112. As shown in FIG. 14, in the preferred embodiment illustrated, the buckle device 270 comprises a buckle groove 271 connected to the first frame portion 111 and a buckle 272 connected to the second frame portion 112, wherein the buckle 272 is columnar and extends outward from the second frame portion 112, and the buckle 272 fits the buckle groove 271 to lock the first frame portion 111 to the second frame portion 112.

Again referring to FIG. 14, the buckle device 270 further comprises a main body portion 273 connected to the first frame portion 111, and the buckle groove 271 is connected below the main body portion 273. In some preferred embodiments, the main body portion 273 is pivotally connected to the first frame portion 111, and a pressing portion 274 is further provided on the main body portion 273. When the buckle device 270 is to be unlocked, the pressing portion 274 may be pressed downward so that the buckle groove 271 tilts upward to separate from the buckle 272, thereby achieving unlocking. Further preferably, an elastic member (not shown) is further connected between the main body portion part 273 and the first frame portion 111, wherein, for example, the elastic member may be configured as a spring or torsion spring, and the elastic member may automatically cause the buckle groove 271 to return to the lock position when the buckle device 270 is moved to the unlock position. It is understandable that in other embodiments not shown herein, the buckle groove 271 may further be arranged on the second frame portion 112 and the buckle 272 may be arranged on the first frame portion 111, or the buckle device 270 may also adopt another structure, wherein, for example, the buckle groove may be arranged as an unclosed circular fastener to be clamped on the second frame portion 112.

The above description of specific embodiments of the present invention is provided, for illustrative purposes, to a person skilled in the art. It is not intended that the present invention be exclusive or be limited to a single disclosed embodiment. As above, those skilled in the field of the above teaching will understand various alternatives and variants of the present invention. Thus, although some alternative embodiments have been specifically described, those skilled in the art will understand, or develop with relative ease, other embodiments. The present invention is intended to include all alternatives, modifications and variants of the present invention described here, as well as other embodiments which fall within the spirit and scope of the present invention described above.

The invention claimed is:

1. A movable vehicle, the movable vehicle comprising: a carrying mechanism and a holding mechanism connected to the carrying mechanism, and a bottom of the carrying mechanism is provided with wheels, wherein the movable vehicle further comprises a starting mechanism arranged on the holding mechanism, the starting mechanism comprising: a starting unit configured to be movable between an initial position and a start position, wherein the entire starting unit is irremovably arranged on the holding mechanism in both the initial position and the start position; a power supply unit; a controller configured to be electrically connectable to the power supply unit, wherein when the starting unit is in the start position, the starting unit is coupled to the controller to activate an electrical connection between the controller and the power supply unit, and when the starting unit is in the initial position, the starting unit is decoupled from the controller; the starting mechanism further comprising a locking portion, the locking portion having a lock position and an unlock position and being configured to, when in the lock position, lock the starting unit in the initial position.

2. The movable vehicle as claimed in claim 1, wherein the starting unit is configured as a knob rotatably arranged on the holding mechanism, the knob being configured to be rotatable between the start position and the initial position.

3. The movable vehicle as claimed in claim 1, wherein the locking portion is configured as a locking rod and that one of the locking rod and the starting unit is provided with a protrusion and the other one thereof is provided with a recess that fits the protrusion, the protrusion being removably coupled in the recess.

4. The movable vehicle as claimed in claim 3, wherein the locking rod is pivotally connected to the holding mechanism around a pivot shaft and a pressing portion is arranged on the locking rod, the pressing portion being opposite the protrusion on both sides relative to the pivot shaft.

5. The movable vehicle as claimed in claim 1, the movable vehicle further comprising an electric motor and a driving unit connected to the electric motor, wherein the electric motor drives a wheel axle of the wheels through the driving unit.

6. The movable vehicle as claimed in claim 5, the movable vehicle further comprising a clutch mechanism arranged on the carrying mechanism, and the clutch mechanism is configured to cause the driving unit to be selectively coupled to or decoupled from the wheel axle of the wheels.

7. The movable vehicle as claimed in claim 1, the movable vehicle further comprising a first housing portion and a second housing portion opposite the first housing portion, the first housing portion is arranged on a side of the holding mechanism near the carrying mechanism, the first housing portion and the second housing portion are butt-jointed at the holding mechanism, the first housing portion and the second housing portion form an accommodating space, and the controller, a part of the locking portion, and a first connecting member are arranged in the accommodating space.

8. The movable vehicle as claimed in claim 7, wherein one of the first housing portion and the second housing portion is provided with a first through hole and a second through hole, a direction adjustment rod extending through the first through hole, the locking portion extending through the second through hole.

9. The movable vehicle as claimed in claim 1, wherein the carrying mechanism comprises a first frame portion and a second frame portion, the first frame portion being connected to the second frame portion, the first frame portion being pivotable relative to the second frame portion between an initial position and a lifted position,
wherein the carrying mechanism further comprises a support device, wherein a first end of the support device is connected to the first frame portion and a second end thereof is connected to the second frame portion, and the support device is configured to support the first frame portion when the first frame portion is in the lifted position, thereby keeping the first frame portion in the lifted position.

10. The movable vehicle as claimed in claim 9, wherein the holding mechanism is connected to one end of the second frame portion, the first frame portion is pivotally connected to the second frame portion around a first pivot shaft, and the first pivot shaft is connected to the other end of the second frame portion away from the holding mechanism.

11. The movable vehicle as claimed in claim 10, wherein the second frame portion comprises a second distal bracket, the second distal bracket being arranged at one end of the second frame portion away from the holding mechanism, the first frame portion comprises a first distal bracket, the first distal bracket being arranged at one end of the first frame portion away from the holding mechanism, and the first distal bracket is further away from the holding mechanism than the second distal bracket.

12. The movable vehicle as claimed in claim 11, wherein the first frame portion further comprises a first extension frame and a second extension frame arranged to be substantially parallel to the first extension frame, the first distal bracket is connected to the ends of the first extension frame and the second extension frame, the first frame portion further comprises an intermediate bracket connected between the first extension frame and the second extension frame, and the intermediate bracket is arranged to be substantially parallel to the first distal bracket.

13. The movable vehicle as claimed in claim 12, wherein a first end of the support device is connected to the intermediate bracket and a second end thereof is connected to the second distal bracket.

14. The movable vehicle as claimed in claim 13, wherein the support device comprises a mounting base, the mounting base being fixedly connected to the second distal bracket, a second pivot shaft being arranged on the mounting base.

15. The movable vehicle as claimed in claim 14, wherein the support device further comprises a first support portion and a second support portion, the first support portion and the second support portion are separate components, the first support portion is connected to the intermediate bracket, the second support portion is connected to the second distal bracket, and the support device further comprises an elastic member configured to act simultaneously on the first support portion and the second support portion.

16. The movable vehicle as claimed in claim 15, wherein the first support portion comprises a first peripheral portion and a first extension section connected to the first peripheral portion, the second support portion comprises a second peripheral portion and a second extension section connected to the second peripheral portion, the first extension section and the second extension section are arranged opposite each other, the elastic member is configured as a spring, and the spring is sleeved on the outside of at least one of the first extension section and the second extension section, wherein, when the first frame portion is in the initial position, the spring is in a compressed state and both ends thereof are respectively connected to the first peripheral portion and the second peripheral portion.

17. The movable vehicle as claimed in claim 16, wherein when the first frame portion is in the lifted position, the spring is in a free state.

18. The movable vehicle as claimed in claim 16, wherein the support device further comprises a housing portion, the housing portion is sleeved on the outside of at least one part of the second support portion and the first support portion, the housing portion is connected to the mounting base, a slender guide hole is provided on the housing portion, the first support portion is provided with a protrusion, and the protrusion extends through the slender guide hole and is slidable along the slender guide hole.

19. The movable vehicle as claimed in claim 9, wherein the carrying mechanism further comprises a buckle device, the buckle device comprising a buckle groove and a buckle that fits the buckle groove, and one of the buckle groove and the buckle is connected to the first frame portion and the other one thereof is connected to the second frame portion.

20. The movable vehicle as claimed in claim 19, wherein the buckle device further comprises a main body portion, the main body portion being pivotally connected to the first frame portion, the buckle groove being connected to the main body portion.

21. The movable vehicle as claimed in claim 9, wherein when the first frame portion is in the initial position, the first frame portion is arranged to be substantially parallel to or in one plane with the second frame portion, and when the first frame portion is in the lifted position, the first frame portion is arranged substantially perpendicular to the second frame portion.

22. The movable vehicle as claimed in claim 1, wherein the starting unit comprises a body and a first connecting member, the controller is provided with a second connecting member, and when the starting unit is in the start position, the first connecting member and the second connecting member are coupled together, wherein the first connecting member is integrally formed on the body.

23. A movable vehicle, the movable vehicle comprising:
a carrying mechanism and a holding mechanism connected to the carrying mechanism, and a bottom of the carrying mechanism is provided with wheels,
the carrying mechanism comprising an electric motor and a driving unit connected to the electric motor, wherein the electric motor drives a wheel axle of the wheels through the driving unit, and
a clutch mechanism arranged on the carrying mechanism, and the clutch mechanism is configured to cause the driving unit to be selectively coupled to or decoupled from the wheel axle of the wheels,
wherein the clutch mechanism comprises a linkage device, wherein the linkage device is coupled to the driving unit, and the linkage device is configured to be controllable to switch between a first position and a second position, wherein, when the linkage device is in the first position, the driving unit is coupled to the wheel axle of the wheels, and when the linkage device is in the second position, a part of the driving unit is decoupled from the wheel axle of the wheels;
wherein the movable vehicle further comprises a starting mechanism arranged on the holding mechanism, the starting mechanism comprising:
a starting unit configured to be switchable between an initial position and a start position; a power supply unit; and a controller configured to be electrically connectable to the power supply unit, wherein when the starting unit is in the start position, the starting unit is coupled to the controller to activate an electrical connection between the controller and the power supply unit, and when the starting unit is in the initial position, the starting unit is decoupled from the controller.

24. The movable vehicle as claimed in claim 23, wherein the clutch mechanism further comprises an operating device connected to the linkage device, the operating device being operable to drive the linkage device to move.

25. The movable vehicle as claimed in claim 24, wherein the operating device is operable to perform linear movement, driving the linkage device to rotate between the first position and the second position.

26. The movable vehicle as claimed in claim 23, wherein the driving unit comprises a first driving member and a second driving member, the first driving member comprising a first gear, the second driving member comprising a second gear, the linkage device being coupled to the first gear, the first gear being connected to a motor shaft of the electric motor, the second gear being fixedly connected to the wheel axle of the wheels, wherein when the linkage device is in the first position, the first gear engages with the second gear, and when the linkage device is in the second position, the first gear disengages from the second gear.

27. The movable vehicle as claimed in claim 26, wherein the linkage device comprises a connecting member connected to an operating device and a shift fork connected to the connecting member, the shift fork being coupled to the first gear.

28. The movable vehicle as claimed in claim 27, wherein the operating device comprises an operating portion and a rod-shaped portion, wherein a first end of the rod-shaped portion is connected to the operating portion and a second end of the rod-shaped portion is connected to a first segment.

29. The movable vehicle as claimed in claim 28, wherein the second end of the rod-shaped portion is provided with a reverse hook portion, the reverse hook portion having a substantially U-shaped cross section, and the reverse hook portion being connected in a through hole.

30. The movable vehicle as claimed in claim 27, wherein the first driving member further comprises a sleeve portion connected to the first gear and a flange portion connected to the sleeve portion, the sleeve portion and the flange portion are sleeved onto the outside of the motor shaft, the first gear and the flange portion are respectively arranged at two ends of the sleeve portion, and the shift fork is positioned between the first gear and the flange portion and is coupled to the sleeve portion.

31. The movable vehicle as claimed in claim 30, wherein the shift fork comprises a main body portion as well as a first shift fork portion and a second shift fork portion that extend outward from the main body portion, the main body portion is fixedly connected to the connecting member, and the first shift fork portion, the second shift fork portion, and the main body portion are arranged around the sleeve portion.

\* \* \* \* \*